United States Patent [19]
Horstmann

[11] Patent Number: 5,168,414
[45] Date of Patent: Dec. 1, 1992

[54] FAULTED CIRCUIT INDICATOR

[75] Inventor: Hendrik Horstmann, Ratingen, Fed. Rep. of Germany

[73] Assignee: Dipl.-ing. H.Horstmann GmbH, Heiligenhaus, Fed. Rep. of Germany

[21] Appl. No.: 532,026

[22] Filed: May 25, 1990

[51] Int. Cl.$^5$ ............................................. G08B 21/00
[52] U.S. Cl. ........................................ 361/59; 361/63; 361/92; 340/652
[58] Field of Search .................. 361/42, 63, 64, 93, 361/92, 59; 340/652, 643, 664; 324/522, 424

[56]             References Cited
          U.S. PATENT DOCUMENTS

| | | | |
|---|---|---|---|
| 3,922,659 | 11/1975 | Dighe | 340/652 |
| 4,176,350 | 11/1979 | Patterson | 340/652 |
| 4,616,216 | 10/1986 | Meirow et al. | 340/652 |
| 5,010,438 | 4/1991 | Brady | 361/56 |

Primary Examiner—Todd E. DeBoer
Attorney, Agent, or Firm—James E. Tracy

[57]                ABSTRACT

Error-free, reliable registration of a fault in a power distribution circuit is achieved by a faulted circuit indicator that measures the current in the circuit after a discrete time delay following the detection of an overcurrent condition. A fault is registered only if the measured current is less than a prescribed level, evidencing that the overcurrent has operated a protection device (such as a fuse), upstream from the faulted circuit indicator, to interrupt the circuit and clear the fault. Hence, only actual (true) faults, resulting in circuit interruption and isolation of the fault, will be indicated, thereby precluding false registrations that may otherwise occur from non-faults such as transient currents, momentary overloads, inrush currents, and the like.

23 Claims, 1 Drawing Sheet

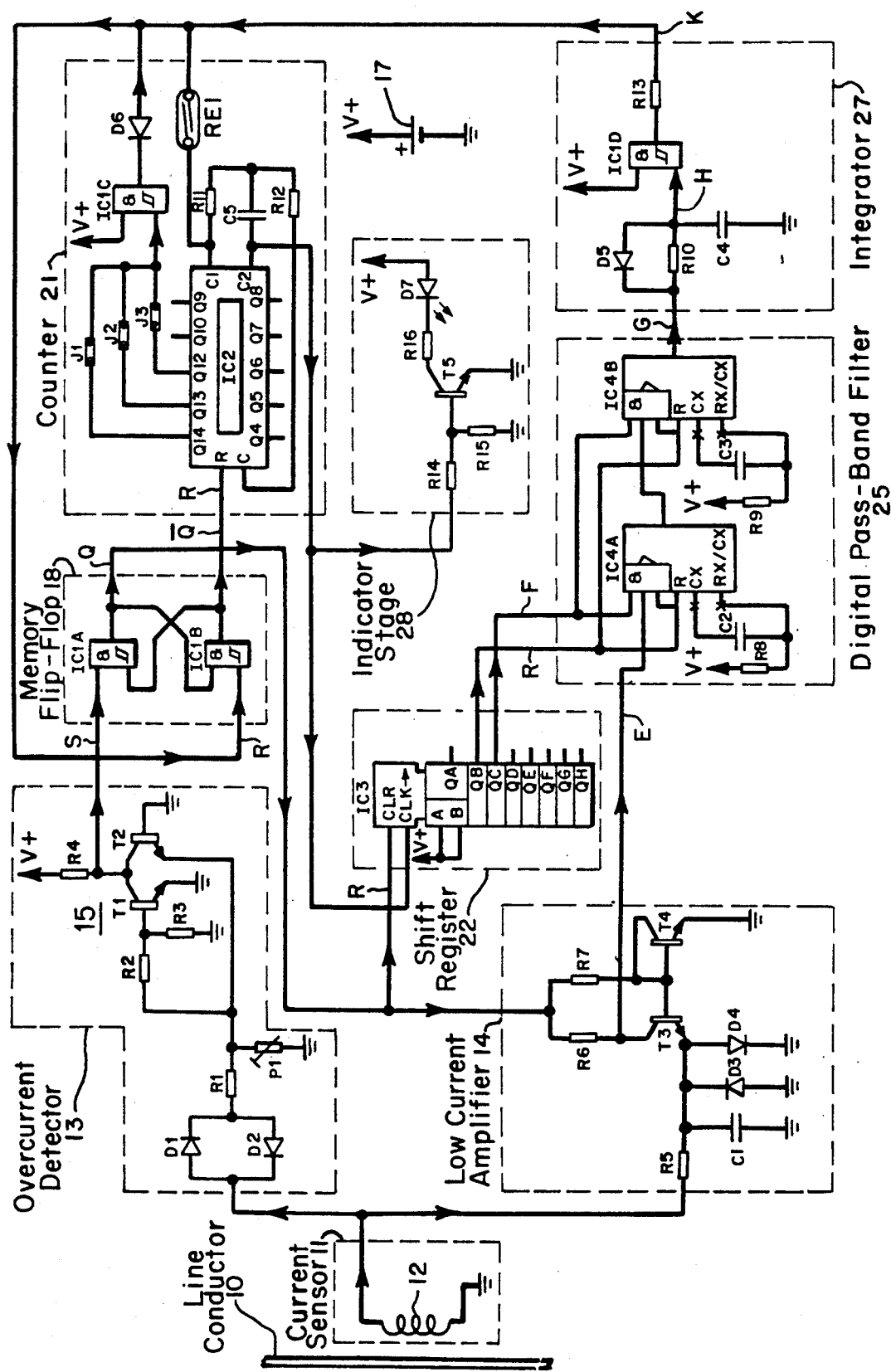

FAULTED CIRCUIT INDICATOR

BACKGROUND OF THE INVENTION

This invention relates to a faulted circuit indicator for monitoring the current in an alternating current power distribution circuit and providing a fault registration or signal only when abnormally high overcurrent in the circuit is sufficient to have operated a protection device upstream from the faulted circuit indicator.

Faulted circuit indicators are generally employed in a power distribution circuit to sense the current in a line conductor, such as an overhead uninsulated line or an underground insulated cable, which connects a power source to a load. When there is a fault in the circuit, for example an insulation breakdown in an underground cable, the line conductor may become grounded thereby causing overcurrent, namely high amplitude current above a predetermined threshold level, to flow through the line conductor. In response to that overcurrent, the faulted circuit indicator trips and registers or records the fact that a fault exists in the line conductor, or somewhere in the distribution circuit such as in a transformer, downstream from the faulted circuit indicator. The fault current or overcurrent normally causes a protection device, such as a fuse, to operate and interrupt the distribution circuit, thereby clearing and isolating the fault. Meanwhile, the fault registration (which may take the form of a blinking light) continues after the fuse blows to allow a lineman or service personnel to pinpoint the location of the problem.

Unfortunately, prior faulted circuit indicators are not always reliable since they are subject to providing false fault registrations in response to non-fault conditions, namely transients and temporary overloads causing overcurrents that exceed the trip setting of the indicator but do not result from actual or true faults and do not effect operation of the protection device and interruption of the distribution circuit. For example, when a distribution circuit is initially closed and thereby energized, transformer magnetizing inrush current may have a peak amplitude exceeding the threshold or trip current rating of the indicator. As another example, capacitor inrush/outrush current may momentarily be greater than the threshold level.

Various approaches have been taken to cure this deficiency of prior faulted current indicators, but the remedies have introduced other shortcomings. For example, a current reset feature has been incorporated in a faulted circuit indicator to automatically erase a false fault registration when continuing current exists at an amplitude above a predetermined minimum and at the main frequency of the power source feeding the distribution circuit, thereby evidencing normal load current. When the main frequency is 60 hertz (Hz), the minimum amplitude level is typically 3 amperes. Automatic reset does not always function properly, however, since the normal load current may actually be less than 3 amperes on a lightly loaded high voltage distribution circuit (where the line voltage is, for example, 25 KV) during periods of minimum load consumption. It is not possible to reduce the minimum reset current, required to erase the fault registration, due to the influence of adjacent phases. Moreover, with automatic reset faulted circuit closings and reclosings will result in false fault registrations from non-fault transients.

Faulted circuit indicators have also been designed that cannot be tripped by overcurrent for an initial time period (for example, 0.5 seconds) following the circuit closure or reclosure. This is called inrush restraint and neutralizes the deleterious effects of inrush currents, allowing them to time out and decay to a harmless value. The disadvantage of inrush restraint is that it also prevents registration from valid faults during the same initial time period. If a fault exists when a lineman first closes a circuit, he has no convenient way of locating the fault because the protection device will have operated and interrupted the circuit before the faulted circuit indicator will function.

The faulted circuit indicator of the present invention constitutes a substantial improvement and advancement over those previously developed in that error-free results are always obtained and a false registration never occurs. If at any time the monitored distribution circuit experiences a fault where the overcurrent is sufficient to trigger an upstream protection device to open the circuit, that fault will be registered, and this is true even though the fault may already exist at the time the circuit is closed or energized. On the other hand a non-fault, that results in overcurrent but not in the operation of the protection device, will not be registered, thereby always providing an absolutely reliable indication of the condition of the monitored circuit.

SUMMARY OF THE INVENTION

The invention provides a faulted circuit indicator for registering a fault in response to overcurrent in an alternating current power distribution circuit only when the overcurrent causes a protection device, upstream from the faulted circuit indicator, to interrupt the circuit and clear the fault. The faulted circuit indicator comprises sensing means for monitoring the current flowing through the power distribution circuit and overcurrent detecting means, which respond to the sensing means, to detect an overcurrent condition. There are control means responsive to the sensing means and to the overcurrent detecting means for examining the current in the power distribution circuit during a predetermined examination time interval subsequent to the time at which an overcurrent condition is detected. Indicating means, controlled by the control means, provide a fault registration only when the current examined during the predetermined examination time interval has an amplitude less than a prescribed level, which is essentially zero current, thereby positively indicating that an actual fault exists and that the distribution circuit has been interrupted by the protection device as a result of the overcurrent condition. Preferably, a discrete time delay is introduced following the detection of the overcurrent condition and before the beginning of the predetermined examination time interval to allow the protection device sufficient time to actuate in response to the overcurrent. The detection of overcurrent which is then followed, after a waiting period of a discrete time delay, by the detection of essentially zero current clearly and unambiguously evidences that the protection device has opened the distribution circuit in response to the overcurrent.

DESCRIPTION OF THE DRAWING

The features of the invention which are believed to be novel are set forth with particularity in the appended claims. The invention may best be understood, however, by reference to the following description in conjunction with the accompanying drawing which schematically illustrates a faulted circuit indicator constructed in accordance with one embodiment of the invention, and the manner in which the indicator is coupled to an alternating current power distribution circuit for monitoring the current therein.

DESCRIPTION OF THE PREFERRED EMBODIMENT

Turning now to the drawing, line conductor 10, which may be an open wire or an insulated cable, carries the load current in the monitored power distribution circuit or system from a power source to a load. It is assumed that a protection device, such as a fuse or circuit breaker, is connected in series with the line conductor upstream from the illustrated faulted circuit indicator, namely between the power source and the indicator. In this way if a fault occurs downstream from the indicator (between the indicator and the load) the fault current or overcurrent will pass through both the protection device and the indicator.

Current sensor 11, which functions as a transformer, is provided to monitor or sense the current flowing through line conductor 10 and consequently flowing through the power distribution circuit. Sensor 11 includes a coil 12 (the transformer's secondary winding) that is inductively coupled to line conductor 10 which constitutes a single turn primary winding of the transformer. Coil 12, preferably located on an enclosed yoke completely surrounding the line conductor, responds to the magnetic field produced by the current in conductor 10 to develop an alternating signal voltage proportional to the conductor current.

The lower terminal of coil 12 is connected to a ground plane of reference potential, or zero volts, while the upper terminal connects to the input of overcurrent detector 13 and also to the input of low current amplifier 14. The signal voltage developed across coil 12, which may have either a positive or a negative polarity relative to ground, is applied through diodes D1 and D2, in overcurrent detector 13, and reduced by the voltage divider formed by resistance R1 and potentiometer P1 for application to the input of the amplifier 15 comprising transistors T1 and T2 and resistances R2, R3 and R4. The supply voltage V+ for operating amplifier 15, and for operating the other stages in the illustrated faulted circuit indicator, is preferably provided by a lithium battery 17 (shown on the right in the drawing) having a very long service life. The standby power drain of the faulted circuit indicator is so low that the indicator is a stand alone unit that requires a replacement of the battery only very infrequently.

Overcurrent detector 13 responds to the signal voltage from current sensor 11 only when that signal voltage reflects an overcurrent condition in line conductor 10. The overcurrent level, to which the dector responds and turns amplifier 15 on, is set by adjusting the detector's switching threshold or triggering level and this is achieved by adjusting potentiometer P1. Overcurrent or overload of conductor 10 is usually the maximum current allowable in the line. When the current in conductor 10 is less than the overcurrent level, the signal voltage applied to overcurrent detector 13 will have a peak amplitude less than the threshold voltage, and amplifier 15 will remain non-conductive or off (both of the transistors T1 and T2 being off), providing a digital signal of logic 1 (the magnitude of the voltage supply V+) at the amplifier's output. On the other hand, if the overcurrent level is exceeded in conductor 10, the signal voltage from coil 12 will have a peak amplitude, of positive and/or negative polarity, greater than the threshold voltage, as a consequence of which amplifier 15 is rendered conductive and turned on to produce a logic 0 (essentially zero volts) output signal. A positive polarity or positive-going peak of the signal voltage switches transistor T1 on, while a negative-going or negative polarity peak turns transistor T2 on. In effect, amplifier 15 amplifies negative as well as positive signal voltages from current sensor 11 and thus also functions as a rectifier. By switching amplifier 15 on in response to a signal voltage of either polarity, the operation of the illustrated faulted circuit indicator is made independent of the polarity of the overload.

The output of amplifier 15, and thus the output of detector 13, is connected to the set or S input of a memory flip-flop 18, specifically an RS flip-flop, formed by the two cross-coupled or fedback NAND gates IC1A and IC1B. The RS flip-flop has a reset or R input, along with a pair of complementary outputs Q and $\bar{Q}$. The set input is normally at logic 1 and the flip-flop is in its reset condition or state wherein output Q provides a logic 0 output signal and output $\bar{Q}$ produces a logic 1 output signal. When overcurrent is detected and amplifier 15 switches to its conductive condition, a logic 0 signal is applied to the set input to switch the flip-flop to its set condition, at which time output Q becomes logic 1 and output $\bar{Q}$ becomes logic 0. Thereafter, memory flip-flop 18 will not be returned to its reset condition until a logic 0 signal is applied to the flip-flop's reset input. In effect, memory circuit 18 is actuated from its reset to its set condition by overcurrent detector 13 in response to the detection of an overcurrent condition, and when it is so actuated the memory circuit stores information representing that overcurrent or overload has occurred.

Timing means, which includes an oscillator-driven counter 21 and a shift register 22, are controlled by memory flip-flop 18 to in turn control the time sequence of operations in the faulted circuit indicator. It is the timing means which, after detection of overcurrent, selects a predetermined time interval during which the current in the power distribution circuit is measured to determine if the current's magnitude is less than a prescribed level. The timing means also schedules the examination time interval so that it is preceded by a discrete time delay, thereby to provide a waiting period or time gap between overcurrent detection and the measurement of the load current in conductor 10. More particularly, counter 21 may take the form of a Toshiba integrated circuit TC74HC4060P/F which is a 14-stage binary counter/divider with an integrated oscillator. Output $\bar{Q}$ of flip-flop 18 is connected to the clear or release input R of the counter. The oscillator frequency is determined by external resistances R11 and R12 and capacitance C5. The oscillator is connected with scales within the counter whose outputs Q12, Q13 and Q14 lead to bridges J1, J2 and J3. One of the bridges can be connected to NAND gate IC1C switched as an inverter. Of course, the oscillator frequency may be set as desired. For purposes of illustration it will be assumed that appropriate external components are employed to adjust the frequency so that the period duration of a complete oscillation cycle is 1.8 seconds. It has been found that the invention functions extremely well when time windows or intervals, each of 1.8 seconds duration, are created. The output of inverter or gate IC1C connects to the reset input of flip-flop 18 via diode D6.

Shift resister 22, of the timing means, may be provided by a Toshiba integrated circuit TC74HC164P/F which is an 8-bit serial-in, paralled-out shift register. Its clear or reset R input is connected to the Q output of flip-flop 18, while the register's clock input connects to the oscillator in counter 21 to receive the oscillator signal. With this arrangement, once the shift register is enabled or made operable, by means of a signal on its clear or reset input, it will shift every 1.8 seconds, thereby providing an output signal that shifts or transfers sequentially from one output to the next every 1.8 seconds. It is to be noted that both of the serial inputs A and B are always established at logic 1.

Output Q of flip-flop 18 also connects to low current amplifier 14 to supply thereto a controlled operating voltage. The amplifier, which comprises transistors T3 and T4 and resistances R6 and R7, has an input circuit (diodes D3 and D4, resistance R5 and capacitance C1) coupled to the sensing coil 12 of current sensor 11. Normally, output Q of the flip-flop is at logic 0 (zero volts), amplifier 14 thereby being disabled or turned off.

The output of low current amplifier 14 leads to input E of digital pass-band filter 25 which may be a Toshiba integrated circuit TC74HC123P/F. It comprises two identical, retriggerable monoflops or monostable multivibrators IC4A and IC4B. The resetting and release inputs of the two monoflops are connected to each other, forming the joint resetting input R and the release input F of the digital pass-band filter. The resetting input R connects to output QB of the shift register 22 and the release input F is connected to the register's QC output. The dwell period of the first monoflop IC4A is determined by resistance R8 and capacitance C2. The output of the first monoflop is connected to the input of the second monoflop IC4B, whose dwell time is specified by components R9 and C3.

In a manner to be explained, low current amplifier 14 will be turned on, to receive and amplify the signal voltage from coil 12, and pass-band filter 25 will be operated to effectively sample and inspect the output signal of the amplifier during a predetermined examination time interval following the detection of overcurrent in order to measure the load current in line conductor 10 during that time interval. Since it is the load current in the distribution circuit to be examined, it is desired that the frequency response range or bandpass characteristic of filter 25 be limited to those frequencies above and below the main frequency (which will be assumed to be 60 Hz) of the power source supplying the distribution circuit. The corner frequencies of the bandpass response curve are determined by the reciprocal of the dwell periods of the first and second monoflops IC4A and IC4B. The upper corner frequency is established by monoflop IC4A at 80 Hz, while the lower corner frequency is set by monoflop IC4B at 40 Hz. The median frequency of the pass-band thus coincides with the frequency 60 Hz. of the main voltage.

Output G of pass-band filter 25 is connected to an integrator 27 that includes an integrating circuit (resistance R 10, diode D5 and capacitance C4) whose output H connects to the input of a NAND gate IC1D switched as an inverter. Output K of integrator 27 connects, via resistance R13, the output of inverter or gate IC1D to the resetting input R of memory flip-flop 18. When a signal is applied over output G to the integrating circuit sufficient to charge capacitance C4 to a logic 1 voltage level, a logic 0 signal will appear on output K. Otherwise, output K will be established at logic 1.

Indicator stage 28 provides a fault registration or indication only when a valid fault is detected and is cleared by the protection device. The input circuit (resistances R14 and R15) of stage 28 is connected to the oscillator of counter 21 to receive logic 1 signals which in turn drive transistor T5 to energize light emitting diode or LED D7 via resistance R16. The visible signalling device (LED D7) produces blinking or flashing light pulses when it is conclusively determined, in accordance with the invention, that an actual fault exists in the monitored distribution circuit. Of course, the particular fault registration may take a wide variety of different forms besides flashing an LED. For example, there could be a visual indication such as a mechanical flag. As another example, a mechanical or electronic switch may be actuated to transmit data to a remote control station, such as a sub-station, to signal that the monitored distribution circuit is faulted.

Considering now the overall operation of the faulted circuit indicator, under normal conditions when there is no overload of line conductor 10 amplifiers 14 and 15 and indicator stage 28 will be non-conductive or cut off, flip-flop 18 will be in its reset state, and counter 21, shift register 22 and pass-band filter 25 will be inactive, thereby consuming very little standby power. When overcurrent flows through line conductor 10, the signal voltage developed across coil 12 exceeds the threshold of amplifier 15 and effects conduction thereof, as a consequence of which a logic 0 signal is applied to the set input of flip-flop 18 to switch the flip-flop to its set condition wherein outputs Q and $\bar{Q}$ will be established at logic 1 and logic 0, respectively. The logic 1 voltage level on output Q switches low current amplifier 14 on and releases shift register 22. Meanwhile, the logic 0 signal at output $\bar{Q}$ releases counter 21, whereupon the oscillator in the counter begins to oscillate. As mentioned, the period duration of a complete oscillation cycle will be 1.8 seconds with the dimensioning selected here. The oscillator cycles the internal counter stages and also shift register 22 to control the time sequence of operations. Since the two serial inputs A and B of the shift register are logic 1, every 1.8 seconds the condition logic 1 is cycled into the register. On the first cycle of the oscillator, output QB of shift register 22 becomes logic 1 and on the following cycle (1.8 seconds later) output QC becomes logic 1. With output QB logic 1, digital pass-band filter 25 is switched on and activated via its resetting input R. Input F of the filter is only released as long as output QC is logic 0. When output QC becomes logic 1, release input F is locked.

The signal voltage from coil 12 of the current sensor, which signal voltage is now being translated through the turned-on amplifier 14 to input E of pass-band filter 25, will thus be examined or observed as soon as output QB becomes logic 1 and this examination will continue until output QC becomes logic 1. Since output QB does not become logic 1 until 1.8 seconds subsequent to the time at which the overcurrent condition is detected, the beginning of the examination of the signal voltage from coil 12 is delayed by that time period or time gap. In effect, the appearance of logic 1 on output QB opens an observation window and the appearance of logic 1 on output QC (1.8 seconds later) closes the window to provide a predetermined examination time interval (1.8 seconds in duration) during which the signal voltage, and consequently the current in line conductor 10, is sampled and inspected. The 1.8 second delay or waiting period, between overcurrent detection and the beginning of the examination of the current in conductor 10, provides adequate time for the protection device, upstream from the line conductor, to operate in response to the overcurrent in the event that the overcurrent results from an actual fault in the distribution circuit and not from a non-fault. It will be appreciated that some fuses take substantial time to blow. Moreover, there may be a high impedance fault in response to which a fuse may take longer to blow.

Resistance R5 and diodes D3 and D4 limit the maximum peak amplitude of the signal from coil 12 before that signal is amplified by amplifier 14 and translated to the input E of pass-band filter 25. Output G of the filter produces a logic 1 signal only if the signal on input E has an amplitude indicating that the current in conductor 10 is greater than a prescribed level (which is essentially zero) and a frequency within the corner frequencies, namely within the band pass, of the filter. During the 1.8 second observation window or examination period, a logic 1 voltage level on output G must continue for a time longer than the duration of the integration time of the integrating circuit R10, C4 and D5 in order to provide a logic 1 voltage level across capacitance C4 and thus at output H, signifying that the current in conductor 10, during the predetermined time interval (namely the 1.8 second observation window) when the examination is made, is above the prescribed level. Preferably, the low current detecting means (amplifier 14, filter 25 and integrator 27) is dimensioned so that the prescribed level is only around 0.3 amperes or 300 milliamperes. This is essentially zero current and is far below normal load current even under very light load conditions. Current of less than 0.3 amperes will flow in a dead circuit which has been interrupted or opened by an upstream protection device. The prescribed level is not set at absolute zero current since there may be very small circulating current, such as capacitive current, in the dead distribution circuit even after the expiration of the discrete time delay (1.8 seconds) or waiting period following the detection of overcurrent and before the subsequent 1.8 second examination time interval or observation window. Thus, line current of less than 0.3 amperes will indicate an open distribution circuit.

Assuming that the measured current is found to be greater than the prescribed 0.3 ampere level, the logic 1 voltage at output H is inverted by inverter or gate IC1D to logic 0 on output k for application to the reset input of flip-flop 18. The flip-flop thereupon resets and amplifier 14, counter 21, shift register 22 and pass-band filter 25 once again become inactive. Hence, even though overcurrent occurred, it did not result from a true fault that would have effected operation of the protection device and interruption of the distribution circuit. By resetting flip-flop 18 as soon as logic 0 is produced on output K during the examination time interval, counter 21 is deactivated before pulses are supplied to indicator stage 28 to blink the LED and register a fault. In this way, no false fault registration is made.

In the event that a valid fault is present, the resulting overcurrent opens the protection device and activates the faulted circuit indicator, causing the low current detecting means to observe the current in conductor 10 during the 1.8 second examination time interval between the instant that logic 1 appears on output QB of register 22 and the subsequent instant when logic 1 appears on output QC. With the distribution circuit now dead, the detected current will be less than the prescribed 0.3 ampere level and output K will remain at logic 1, as a consequence of which flip-flop 18 remains in its set state and the oscillator in counter 21 continues to operate. Pulses from the oscillator will therefore be applied to indicator stage 28 to flash or blink LED D7 in a 1.8 second cycle. A positive, error-free registration is thus made which indicates that an actual fault exists and that the distribution circuit has been interrupted as a result of the overcurrent condition. The detection of overcurrent followed, after a waiting period, by the detection of essentially zero line current, provides concrete evidence that the protection device has been actuated.

The oscillation frequency is subdivided into 14 scales by counter 21. Three outputs of these scales can be connected to gate or inverter IC1A via bridges J1, J2 or J3, Depending on the bridge switched on, there is a cycle time at the three outputs of one, two or four hours. Thus, the counter functions as a long-period transmitter that automatically resets or times out, the cycle time corresponding to the selected resetting time. The LED flashes during the entire long period to allow ample time for a lineman to locate and repair the fault. The lineman may manually reset the faulted circuit indicator by triggering a reed contact RE1 by use of a permanent magnet. In the absence of a lineman, once the selected resetting time (for example, after 4 hours) has been reached, a logic 1 signal is applied to inverter IC1C which thereupon produces a logic 0 signal for resetting flip-flop 18 and deactivating counter 21, amplifier 14, register 22 and filter 25.

Of course, while 1.8 seconds has been selected in the illustrated embodiment for the duration of both the discrete time delay, following the detection of overcurrent, and the subsequent predetermined examination time interval, it will be realized that those two time periods are adjustable by adjusting counter 21.

It will also be appreciated that instead of closing the observation window (namely, the examination time interval) after some short period (for example, 1.8 seconds) the window could be left open for the whole period until time reset.

To very briefly summarize the invention, current sensor 11 senses the current flowing through the monitored power distribution circuit. Overcurrent detector 13 responds to the current sensor to detect an overcurrent condition. Flip-flop 18, counter 21, shift register 22, low current amplifier 14, pass-band filter 25 and integrator 27 effectively provide control means responsive to current sensor 11 and to overcurrent detector 13 for examining the current in the power distribution circuit during a predetermined examination time interval subsequent to (specifically 1.8 seconds after) the time at which an overcurrent condition is detected. Indicator stage 28 is controlled by the control means to effect a fault registration only when the current examined during the predetermined examination time interval has an amplitude less than a prescribed level, thereby positively indicating that an actual fault exists and that the distribution circuit has been interrupted by a protection device, to clear the fault, as a result of the overcurrent condition.

While a particular embodiment of the invention has been shown and described, modifications may be made, and it is intended in the appended claims to cover all such modifications as may fall within the true spirit and scope of the invention.

I claim:

1. A faulted circuit indicator for registering a fault in a power distribution circuit only when overcurrent in the circuit effects interruption thereof, comprising:

means for detecting overcurrent in the power distribution circuit;

means for measuring the current in the distribution circuit during an examination time interval following the detection of overcurrent;

and means for providing a fault indication if the measured current, following the overcurrent detection, is less than a prescribed level, thereby evidencing interruption of the circuit and clearing of the fault.

2. A faulted circuit indicator for registering a fault in response to overcurrent in an alternating current power distribution circuit only when the overcurrent causes a protection device, upstream from the faulted circuit indicator, to interrupt the circuit and clear the fault, comprising:

sensing means for monitoring the current flowing through the power distribution circuit;

overcurrent detecting means responsive to said sensing means for detecting an overcurrent condition;

control means responsive to said sensing means and to said overcurrent detecting means for examining the current in the power distribution circuit during a predetermined examination time interval subsequent to the time at which an overcurrent condition is detected;

and indicating means, controlled by said control means, for providing a fault registration only when the current examined during the predetermined examination time interval has an amplitude less than a prescribed level, thereby positively indicating that an actual fault exists and that the distribution circuit has been interrupted as a result of the overcurrent condition.

3. A faulted circuit indicator according to claim 2 wherein said indicating means includes a visible signalling device for producing blinking light pulses.

4. A faulted circuit indicator according to claim 2 wherein said overcurrent detecting means has an adjustable threshold in order to facilitate setting of the overcurrent level.

5. A faulted circuit indicator according to claim 2 wherein a fault registration is effectively automatically erased when normal current flow, at an amplitude above said prescribed level, is restored in the power distribution circuit.

6. A faulted circuit indicator according to claim 2 wherein said control means includes a memory circuit, which is actuated by said overcurrent detecting means in response to the detection of an overcurrent condition, for storing information representing that overcurrent has occured.

7. A faulted circuit indicator according to claim 2 wherein said control means is adjustable in order to permit adjustment of the duration of said predetermined examination time interval.

8. A faulted circuit indicator according to claim 2 wherein said control means introduces a given discrete time delay following the detection of an overcurrent condition and before the beginning of said predetermined examination time interval to allow the protection device, upstream from the faulted circuit indicator, sufficient time to actuate in response to the overcurrent and to interrupt the power distribution circuit.

9. A faulted circuit indicator according to claim 8 wherein said control means is adjustable in order to facilitate the selection of a desired duration for said given discrete time delay.

10. A faulted circuit indicator according to claim 2 wherein the power distribution circuit connects a power source to a load via a line conductor which is interrupted by the protection device when a fault occurs, the current flowing through the line conductor being sensed by said sensing means thereby to monitor the current flowing through the power distribution circuit.

11. A faulted circuit indicator according to claim 10 wherein said sensing means includes a coil inductively coupled to the line conductor for producing a signal voltage proportional to the current flowing through the line conductor and consequently flowing through the power distribution circuit.

12. A faulted circuit indicator according to claim 11 wherein the signal voltage induced in said coil may be either positive or negative relative to a ground plane of reference potential, and wherein said overcurrent detecting means responds to that signal voltage when its peak amplitude of either polarity exceeds an adjustable threshold voltage level in said detecting means, thereby rendering the operation of the faulted circuit indicator independent of the polarity of the overload.

13. A faulted circuit indicator according to claim 2 wherein said control means includes timing means which is effectively started in response to the detection of an overcurrent condition and subsequently selects said predetermined examination time interval during which the current in the power distribution circuit is examined to determine if the current's amplitude is less than the prescribed level.

14. A faulted circuit indicator according to claim 13 wherein said timing means includes an oscillator-driven counter and a shift register.

15. A faulted circuit indicator according to claim 13 wherein said control means includes a memory circuit, which is actuated by said overcurrent detecting means when overcurrent is detected, for storing information reflecting that overcurrent has occurred and for controlling and starting said timing means in response to the overcurrent condition.

16. A faulted circuit indicator according to claim 15 wherein said control means includes low current detecting means which receives a signal from said sensing means and is rendered operable by said timing means during said predetermined examination time interval to effect detection, in the power distribution circuit, of low current below the prescribed level.

17. A faulted circuit indicator according to claim 16 wherein said low current detecting means includes an amplifier coupled to said sensing means and turned on by said memory circuit when the stored information represents an overcurrent condition, said amplifier limiting the maximum peak amplitude of the signal received from said sensing means.

18. A faulted circuit indicator according to claim 17 wherein said low current detecting means also includes a pass-band filter, coupled to said amplifier, for limiting the frequency range of the signal from said sensing means in order to effectively sample and inspect, during said predetermined examination time interval, only the current in the power distribution circuit having a frequency approximately equal to the main frequency of the power source feeding the distribution circuit.

19. A faulted circuit indicator according to claim 18 wherein said control means includes an integrator coupled to said pass-band filter for producing an output signal which causes said indicating means to provide a fault registration when the amplitude of the current inspected during said predetermined examination time interval is below the prescribed level.

20. A faulted circuit indicator according to claim 19 wherein the output of said integrator is coupled to said memory circuit for effectively erasing the stored information, representing that overcurrent has occurred, when it is subsequently determined that the amplitude of the current in the power distribution circuit is above the prescribed level, the output signal of said integrator allowing the stored information in the memory circuit to remain when the current measured during said predetermined time interval is found to be below the prescribed level, said timing means thereupon causing said indicating means to provide a fault registration.

21. A faulted circuit indicator according to claim 20 wherein said memory circuit is established in a set condition when information is stored representing an overcurrent condition, said timing means responding to that set condition, when the measured current during said predetermined examination time interval is below the prescribed level, to control the operation of said indicating means in order to register a fault as long as said memory circuit remains in its set condition.

22. A faulted circuit indicator according to claim 21 wherein, subsequent to the registration of a fault by said indicating means, said timing means automatically resets said memory circuit to a reset condition and turns said indicating means off to cancel the registration after said timing means completes an operating cycle that extends over an adjustable time period.

23. A method for registering a fault in a power distribution circuit only when overcurrent in the circuit effects interruption thereof, comprising the steps of:

detecting overcurrent in the power distribution circuit;

after the expiration of a given discrete time delay following the detection of overcurrent, measuring the current in the distribution circuit during a subsequent predetermined examination time interval;

and thereafter providing a fault indication if the measured current during the predetermined examination time interval is less than a prescribed level, thereby evidencing interruption of the circuit and clearing of the fault.

* * * * *